INVENTORS
EDUARD BLICKISDORF
WILLI LENDENMANN
BY
OSTROLENK, FABER, GERB & SOFFEN
ATTORNEYS

United States Patent Office 3,272,310
Patented Sept. 13, 1966

3,272,310
APPARATUS FOR ORIENTING ARTICLES PARTICULARLY AMPOULES
Eduard Blickisdorf and Willi Lendenmann, Zurich, Switzerland, assignors to Memmel & Co. Aktiengesellschaft, Basel, Switzerland
Filed Nov. 24, 1964, Ser. No. 413,441
Claims priority, application Switzerland, June 2, 1964, 7,181/64
9 Claims. (Cl. 198—33)

This invention relates to apparatus for uniformly orienting and arranging articles, particularly ampoules, in consecutive order.

The orienting and arrangement of mass articles in a continuous row often is a prerequisite for subjecting the articles to further manipulation or processing, for example in the case of ampoules, at printing, labelling, filling and packing stations.

It is accordingly an object of the invention to provide apparatus for uniformly orienting identical articles, particularly ampoules which are supplied at random, in disordered positions, into a continuous row of similarly positioned articles adapted to be fed to further processing devices.

It is a further object of the invention to provide apparatus for arranging articles in uniformly oriented position in a continuous row, and for expulsing such articles, which appear in the row in incorrectly oriented position.

A further object of the invention is to provide apparatus for orienting articles, which, independently of the rate at which the articles are supplied, delivers a predetermined amount of oriented articles per unit of time in a continuous row.

A further object is the provision of apparatus for orienting ampoules, which is of simple construction and reliable operation.

The invention will now be described with reference to the accompanying drawings illustrating an example of apparatus for orienting ampoules. In these drawings, FIGURE 1 is a plan view of an apparatus in which the supply hopper for the articles has been removed.

Figure 2:
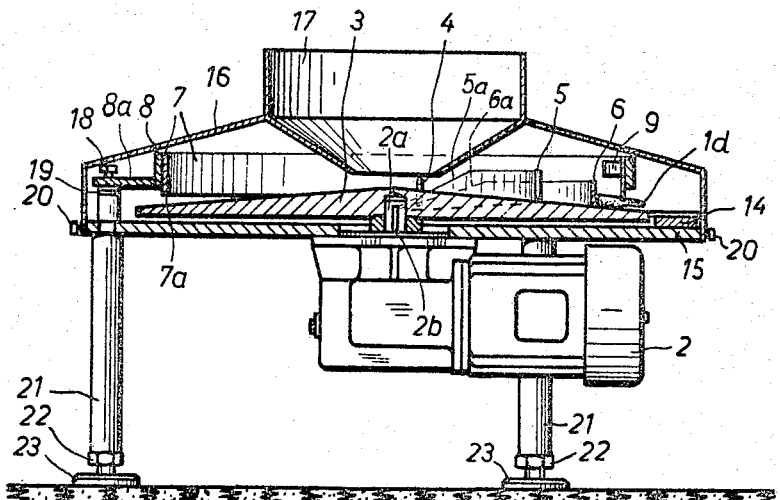
FIGURE 2 shows a vertical section along the line II—II of FIGURE 1.

Referring to the drawings, a base plate 15 is mounted on three columns 21. These columns are longitudinally adjustable by means of nuts 22, threaded on screw bolts of feet 23, in order to level the base plate 15 independently of the place where it is mounted.

A conventional geared motor 2 is secured to the lower face of the base plate and has its driven shaft 2a fixed to a turntable 3 by means of a key 2b. The motor 2 which if desired, may have a continuously variable gear, is connected by means of a supply line and a switch to an electric current source, not shown.

The turntable 3 is driven by the shaft 2a in the direction of the arrow 25. The upper face of the turntable is conically sloping towards the edge of the table. Slightly above the turntable and within the periphery thereof, there is arranged an outer, circularly curved guide wall 7 which is secured to the base plate 15 by means of a guard ring 8, straps 8a and screws 18. The guide wall 7 is maintained by friction only in the guard ring 8 so as to be vertically adjustable, in order to adapt the distance of the lower edge 7a of the wall 7 to the size of the ampoules to be arranged.

Figure 1:
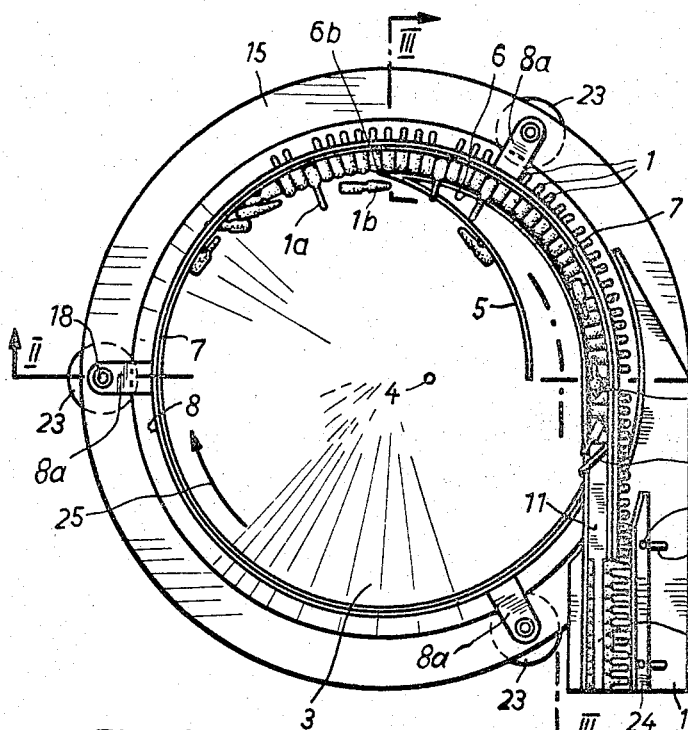
Figure 3:
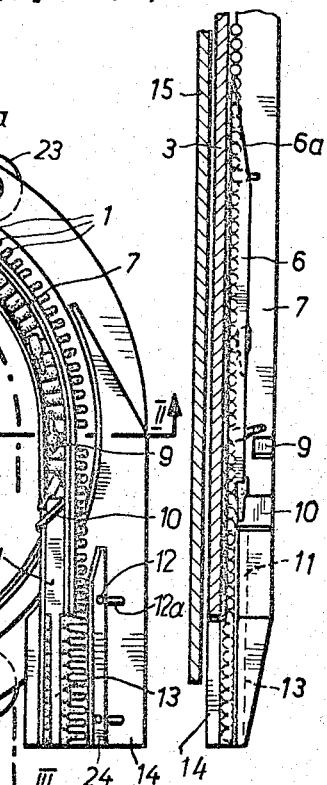
FIGURE 3 is a developed view in section along the line III—III of FIGURE 1.

A fixed diverting guide 5 is provided withinn outer guide 7 and above the turntable 3. This guide 5 extends spirally over a portion of the turntable from a point 6b from which also starts an internal guide wall 6 extending circularly in parallel relationship to the guide wall 7. The height of the guides 5 and 6 is smaller than that of the guide 7 and as shown in FIGURE 1, both guides 5 and 6 have inclined portions 5a and 6a sloping towards the common point 6b.

The outer guide 7 is provided with a first baffle 9 formed by an adjustable diverting plate inclined in the direction of rotation of the turntable 3 towards the center thereof. Spaced in the direction of rotation from this baffle 9, there is a second baffle 10 also provided on the outer guide 7 and extending inwardly above the inner guide 6.

The end portions of the outer guide 7, the guard ring 8, and the inner guide 6 extend tangentially with respect to the turntable 3 towards a discharge table 14 which at the same time, could form a supply table for a further manipulating stage of the ampoules 1.

The last portion of the space between the two parallel inner and outer guides 6, 7 is covered by a plate 11 extending parallel to the upper face of the turntable and ending into a narrow band 13 extending to the end of the table 14. The plate 11 and band 13 serve as a holding-down guide for the ampoules and prevent accumulation and piling thereof.

The outer guide 7 ends before the end of the table 14 and is replaced by a guide ledge 24 formed for example by an angle iron, which is adjustably secured by screws 12 in slots 12a of the table 14.

A supply hopper 17 is secured to the base plate 15 by means of a circular skirt portion 16 serving as cover member and fixed to the plate 15 by clamping screws 20. Preferably, the supply hopper 17 and the skirt portion 16 are made of the same material, i.e., of a transparent plastic.

The described apparatus operates as follows: The ampoules to be arranged in successive order are filled at random into the hopper 17. They fall onto the rotating turntable 3 and owing to the conically inclined face they are rolling towards the outer guide wall 7 along the periphery of the turntable. A vertical pin 4 fixed to the upper face of the turntable adjacent the center thereof and extending to the level of the outlet opening of the hopper 17 prevents the ampoules from becoming jammed at the outlet.

The outer guide 7 has its lower edge at such a distance above the face of the turntable that the neck 1d of the ampoules (FIG. 2) can pass beneath the guide 7, but not the body of the ampoules. The conically sloping upper face of the turntable and the centrifugal force to which the ampoules are subjected coact to correctly position the major portion of the supplied ampoules, that is with the neck portion directed outwardly and passing beneath the guide 7. However, some ampoules may not obtain this correct position and remain with their neck portion inside of the guide 7. The ampoules 1b which remain inside of the correctly positioned ampoules are taken along by the rotating turntable and engage with the diverting guide 5 which deviates them towards the center of the turntable wherefrom they are again driven against the outer guide 7.

The turntable rotating in the direction of the arrow 25, the ampoules 1 engaged underneath the guide 7 and also the incorrectly placed ampoules 1a are taken along and arrive against the beginning 6a of the inner guide 6. The ampoules 1a which are placed with their necks towards the center of the turntable are lifted by their necks along the inclined portion 6a of the guide 6 and move along with the neck sliding on the top edge of the guide 6. They then abut against the baffle plate 9 which pushes them out of the row of correctly advancing ampoules 1 and raises them above this row, so that they move along on top of the correctly placed ampoules and abut against the baffle plate 10. This baffle plate pushes the ampoules 1a out of the space between the guides 6 and 7 and over the upper edge of the guide 6, so that they fall onto the turntable 3 where they again move along the guide 7, owing to the sloping top face of the table and to centrifugal action, and eventually they are engaged in correct position with their neck passing below the guide 7. Those ampoules which arrive at the discharge table 14 all are correctly positioned and can be used for further processing. The holding-down plates 11 and 13 prevent these ampoules from piling up, while after the end of the outer guide 7, the ampoules are guided at their bottom by the guide wall 6 and along their necks by the ledge 24.

As already mentioned, the outer guide wall 7 with the baffle plates 9 and 10, the diverting guide 5 and the inner guide 6 are adjustable with regard to their vertical position above the turntable 3, to permit manipulation of ampoules of different neck and body size. When ampoules are to be handled the size of which is outside the range of adjustment of the guides, the guides 6, 7 can be removed by unscrewing the straps 8a from the base plate 15, and a new set of guides can be placed on top of the turntable, which corresponds to the size of the ampoules.

The turntable 3 can be rotated at any desired speed in order to adapt the delivery of ampoules to the capacity of the next following processing stage of the ampoules.

It will be understood that the present invention is not limited to the particular structure shown but that modifications and variations may be effected without departing from the scope of the appended claims.

We claim:

1. Apparatus for uniformly orienting and arranging articles in consecutive order, comprising a rotatable turntable mounted for rotation about a vertical axis and having an article receiving upper face conically sloping from the center thereof towards the periphery, an article supply hopper above said surface to deliver articles to be oriented upon said turntable, a circularly curved outer guide wall extending over and in proximity of the periphery of said turntable and having a lower edge in spaced relationship with said upper face thereof, a circularly curved inner guide wall extending parallel to said outer guide wall over a portion of the length thereof in radially spaced relationship, said two guide walls forming a pathway between themselves for the articles to be oriented and moved along said pathway by the rotating turntable, and baffle members arranged in the space between said two guide walls and acting to expulse incorrectly oriented articles from said pathway and returning them on said turntable.

2. Apparatus for uniformly orienting and arranging articles in consecutive order, said articles having a body portion and an elongate portion of smaller thickness than the body portion, said apparatus comprising a rotatably mounted turntable having an article receiving upper face conically sloping from the center towards the periphery thereof, an article supply hopper for feeding articles at random position onto said upper face of the turntable, a circularly curved stationary outer guide wall extending coaxially with and near the periphery of said turntable, said outer guide having a lower edge in spaced relationship with said upper face of the turntable to allow said elongate portion of the articles to pass underneath said lower edge but not said body portion, a circularly curved inner guide wall extending parallel to said outer guide wall over a portion of the length thereof in radially spaced relationship, said two guide walls forming a pathway between themselves for the articles to be oriented and moving along said pathway by the rotating turntable, and two baffle members successively arranged in said pathway, the first of said baffle members lifting incorrectly oriented articles the elongate portion of which did not pass underneath the lower edge of said outer guide wall off the row of correctly oriented articles, and the second baffle member expulsing such incorrectly oriented articles from said pathway and returning them on the turntable.

3. Apparatus for uniformly orienting ampoules in consecutive order, said ampoules having a body portion and a neck portion of smaller diameter than the body portion, said apparatus comprising a rotatably mounted turntable having an ampoule receiving upper face conically sloping from the center towards the periphery thereof, an ampoule supply hopper for feeding ampoules at random position onto said upper face of the turntable, a circularly curved stationary outer guide wall extending coaxially with and near the periphery of said turntable, said guide wall having a lower edge in spaced relationship with said upper face of the turntable to allow the neck portion but not the body portion of ampoules fed onto the turntable and moving down the upper face thereof to pass through the space underneath said lower edge of the outer guide wall and thereby become uniformly oriented, a stationary inner guide wall extending parallel to said outer guide wall over a portion of the length thereof in radially spaced relationship, the height of said inner guide wall above the turntable being less than the height of the outer guide wall, said two guide walls forming a passage between themselves for ampoules having been oriented and for ampoules not having been oriented, and baffle members projecting into said passage and adapted to engage ampoules not having been oriented and expulse them out of the passage and back unto the upper face of said turntable.

4. Apparatus as claimed in claim 3 and comprising a diverting wall for non oriented ampoules, said diverting wall extending spirally from the beginning of said inner guide wall towards the central portion of the upper face of said turntable.

5. Apparatus as claimed in claim 3 wherein said outer guide wall, inner guide wall and baffle plates are mounted for vertical adjustment.

6. Apparatus as claimed in claim 3, and comprising a delivery table following said upper face of the turntable at the discharge end of the passage of oriented ampoules formed by said outer and inner guide walls, said guide walls extending along the delivery table and cooperating with a holding down plate extending above the ampoules discharging from said turntable.

7. Apparatus as claimed in claim 3, wherein a motor is provided for driving said turntable by means of an infinitely variable transmission gear.

8. Apparatus as claimed in claim 3, wherein said ampoule supply hopper is mounted coaxially above said turntable, an agitating pin eccentrically carried by said turntable extending into the discharge opening of the hopper to prevent jamming of the ampoules in said opening.

9. Apparatus as claimed in claim 3, wherein said outer and inner guide walls together with said baffle plates are mounted to be exchangeable to adapt the apparatus to handling of ampoules of variable size.

References Cited by the Examiner

UNITED STATES PATENTS

| | | | |
|---|---|---|---|
| 2,857,039 | 10/1958 | Whitecar | 198—33 |
| 3,015,378 | 1/1962 | Thürlings | 198—33 |
| 3,065,834 | 11/1962 | Stähli | 198—33 |

EVON C. BLUNK, *Primary Examiner.*

ROBERT J. HICKEY, *Assistant Examiner.*